3,279,294
REINFORCED BEAMS FOR DIE CUTTING PRESSES
Thomas A. Cook, Beverly, Mass., assignor to United Shoe Machinery Corporation, Flemington, N.J., a corporation of New Jersey
Filed Nov. 19, 1964, Ser. No. 412,357
1 Claim. (Cl. 83—538)

This invention relates to improvements in clicker die cutting presses and more particularly to improvements in beams therefor.

Such cutting presses have one or more beams each connected to an upright post or spindle at the side of a cutting support for swinging over the support and for power operated movement toward and away from the support in cutting strokes. In the operation of such machines, the die is located by hand upon the material carried by the cutting support, the beam is swung manually into position over the die, and mechanism is actuated to effect a pressure-applying operation, after which the beam is swung laterally away from the die to permit removal of the cut blank. During the course of the day, the operator will swing the beam back and forth across the support hundreds or thousands of times. While it is well known to provide power operated means for swinging such beams, the incorporation of such means in clicker presses is undesirable because of attendant complication and expense. Consequently, in order to relieve the operator of as much physical effort as possible, it is desirable that the beam be of light construction, such that it can be readily moved manually across the support.

The importance of light construction in cutting press beams has increased with growing demand for cutting presses of greater force and larger beam area covering larger cutting support areas. Known beam designs adequate simultaneously to provide strength, stiffness and sufficient lightness for manual swinging become inadequate upon scale-up for larger and stronger beams.

Accordingly, it is an object of the present invention to provide an improved cutting press beam suitable for use in large presses and organized to combine strength with lightness to facilitate manual swinging thereof.

Known cutting press beams comprising generally a base bracket, a bottom plate, and cantilever beam superstructure have employed a bottom plate of uniform thickness sufficient to resist the punch-through or shear stresses imposed thereon by cutting dies used with the machine. This results in a bottom plate which is much stronger and heavier than necessary to resist the tensile stresses which occur between the die contact area and the base bracket of the beam.

Further, it is mathematically demonstrable that, for equal resistance to punch-through stresses from die imposed loads, a plate of uniform thickness without reinforcement is heavier than an equally strong combination of a plate together with a reinforcing grid comprising parallel uniformly spaced ribs.

Therefore, in accordance with a feature of the present invention there is provided a cutting press beam having a bottom plate supported by a grid comprising a plurality of parallel uniformly spaced ribs extending laterally from or between longitudinal vertical cantilever web members carried by a base bracket.

In accordance with a further feature of the invention, a further saving of weight is attained in that the plate supporting grid comprises the longitudinal vertical cantilever web members which support the plate along parallel junctions of the plate and web members.

In accordance with a still further feature of the invention, the bottom plate serves as the bottom tensile loaded member of a cantilever beam organization which comprises also the said web members and preferably a top horizontal plate to co-function with the bottom plate in establishing the neutral axis of the beam midway of its height.

The invention thus provides as one of its features a cutting press beam comprising a base bracket, longitudinal vertical cantilever web members carried by the bracket, a bottom plate supported by the web members along parallel spaced junctions of the plate and web members, and a plurality of uniformly spaced parallel ribs of uniform height extending laterally from the web members in supporting relation to the plate.

Preferably, although not necessarily, the ribs extend perpendicularly to the junctions and preferably also extend the full width of the plate.

The illustrative beam thus comprises structural members integrated into an improved cantilever pres beam organization readily susceptible, as hereinafter further described, for calculations to achieve minimum weight for given design specifications of size, loading, etc.

Other features and advantages of the invention will best be understood from the following description taken together with the accompanying drawings in which.

Figure 1:
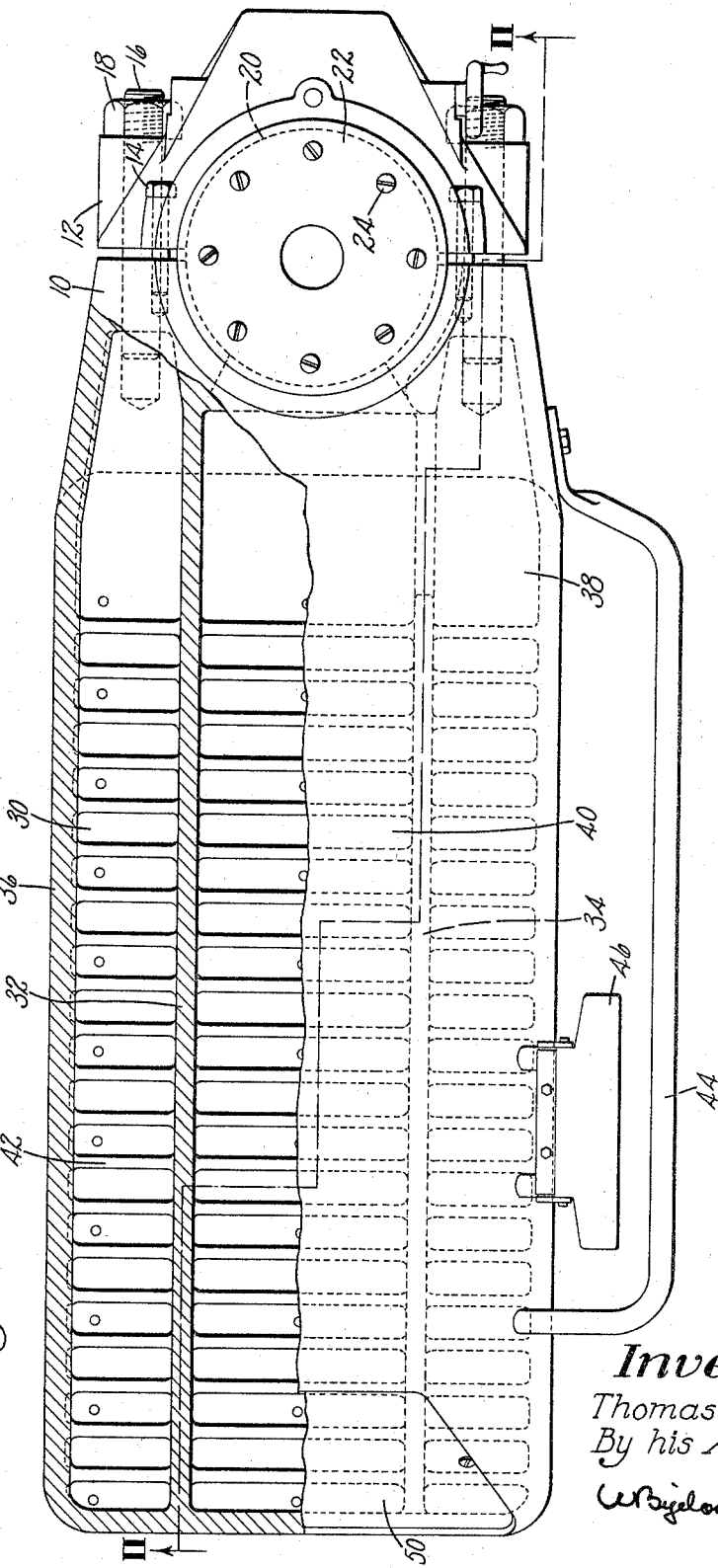
FIG. 1 is a plan view, partly broken away, of a cutting press beam embodying the present invention.
Figure 2:
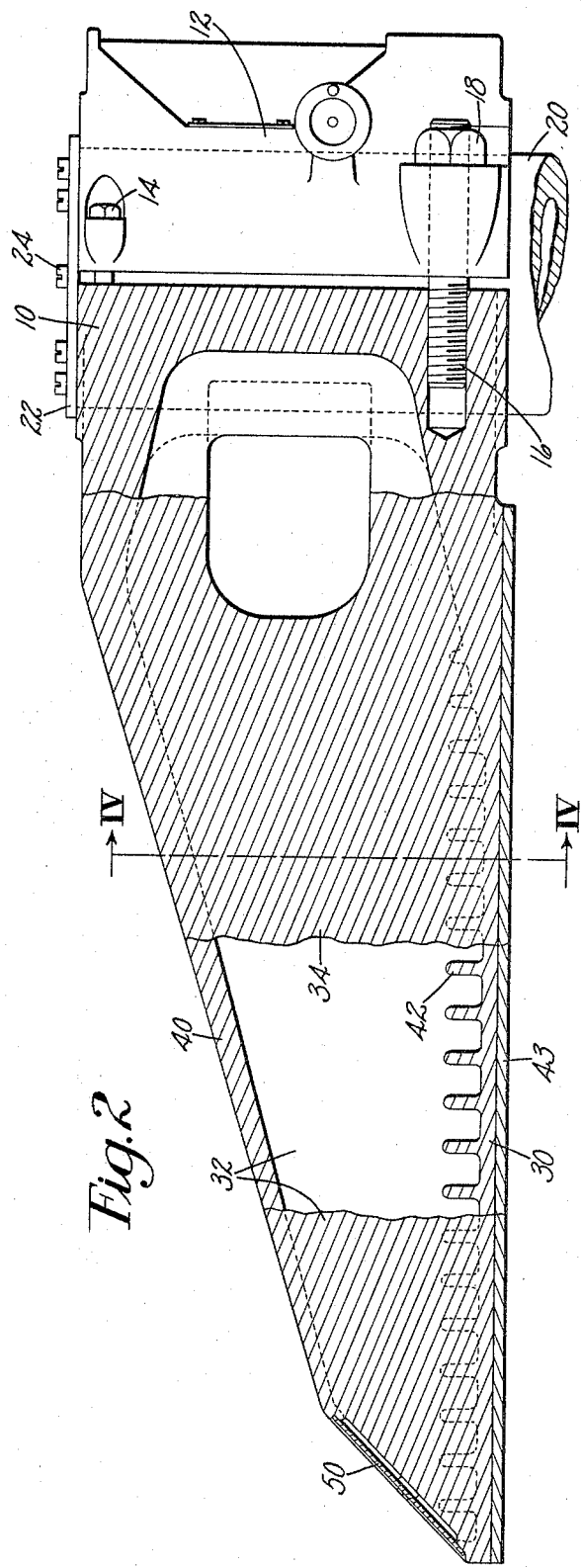
FIG. 2 is a vertical section taken along line II—II of FIG. 1.

Referring particularly to FIGS. 1 and 2 of the drawings, the illustrative beam comprises a base bracket 10 cooperative with a beam clamp 12, bolts 14, studs 16 and nuts 18 for clamping a post 20 between arcuate surfaces of the bracket 10 and clamp 12. A cover plate 22 is attached to the top of the post 20 by bolts 24.

Figure 3:
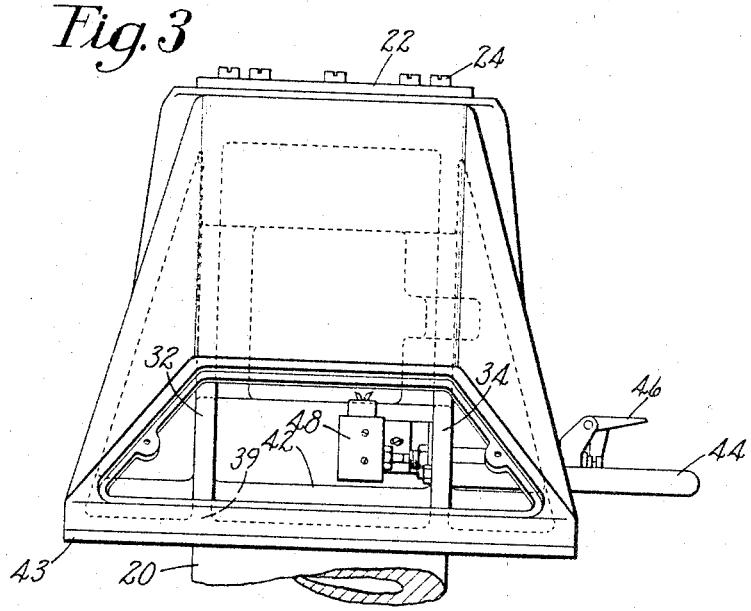
FIG. 3 is a front elevation of the beam shown in FIG. 1.
Figure 4:
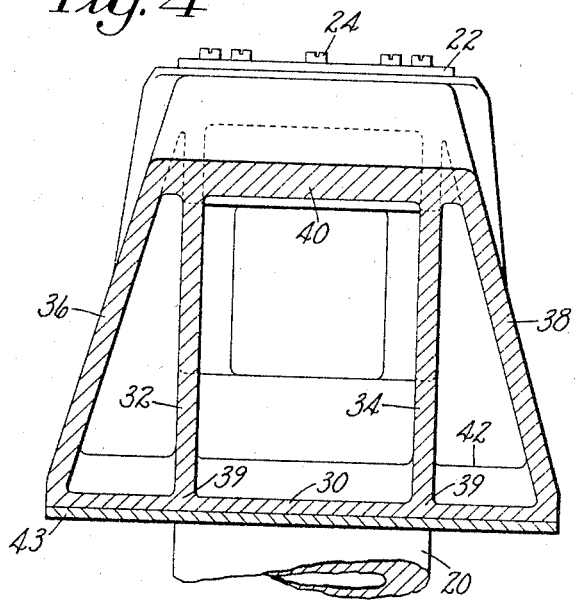
FIG. 4 is a vertical transverse section taken on line IV—IV of FIG. 2.

Referring now also to FIGS. 3 and 4, cantilever beam members are carried by the bracket and suitably, as illustrated, are cast integrally therewith. These members, forming a heightwise tapered box beam, comprise a bottom plate 30, inner longitudinal vertical cantilever web members 32, 34, outer longitudinal vertical cantilever web members 36, 38, and an upper horizontal plate 40. The vertical web members 32, 34, 36 and 38 support the bottom plate member 30 against die loads along spaced parallel junctions 39 extending generally parallel to the longitudinal center line of the beam from the bracket to the outer end of the beam. The bottom plate is supported between the junctions by parallel ribs 42 of uniform height extending laterally from the web members, preferably perpendicular to the longitudinal axis of the junctions although a herringbone relation may also be employed if desired, the ribs serving to transmit local loads to the longitudinal vertical cantilever members. Suitably as shown, the ribs extend the full width of the bottom plate.

The beam is provided with a striking plate 43 (FIGS. 2, 3 and 4) of relatively softer metal than the bottom plate in accordance with usual practice and with a hand bar 44 (FIG. 1) for the convenience of the operator in manually swinging the beam laterally across the bed about the axis of the post, whereby the beam may be positioned over the bed for cutting or swung clear of the bed to permit viewing of the work area and manipulation of the work.

Initiation of a cutting stroke suitably is effected by depression of a finger plate 46 for actuation of a start switch 48 (FIG. 3) to set in motion hydraulically powered means (not shown) for moving the beam toward the bed and automatically returning it to its rest position. A removable nose plate 50 (FIG. 1) provides access to the interior of the beam.

The illustrative beam lends itself, because of its simple but integrated organization, to straightforward and easy design procedure for calculating optimum beam dimensions. While there are a number of ways the dimensioning of this beam design to a given set of circumstances may be carried out, the following generalized statement of one procedure will assist in understanding how the illustrative beam organization lends itself to calculation of dimensions for a beam which approaches the lightest possible for a given set of circumstances.

First, a load condition corresponding to a "worst operational case" is postulated. For example, after considering the field of use of a press being designed, it is judged that a 3″ circular die will provide the worst combination of load pressure (P) and area (A) for such use. The die is considered to have its load pressure spread by the striking plate over a 3″ circular area and it is assumed that the die can apply a given load pressure anywhere on the bottom plate.

Second, the height ($h$) and thickness ($t_R$) dimensions of the ribs are chosen suitably to accommodate casting practice in facilitating the casting operation.

Third, on the basis of a suitable analytic model, the stresses in the plate are analyzed in terms of rib spacing ($a$) and bottom plate thickness ($t_P$) to arrive at a minimum weight (W) of the bottom plate and ribs for the load conditions. The closest known analytic model is that shown at the top of page 134 of Den Hartog: Advanced Strength of Material (McGraw-Hill 1952). On the basis of the model (and assuming the width of the grid is more than twice the rib spacing), the following equation is established:

$$M_1 = .083 \frac{P}{A} a^2 \qquad (1)$$

And from the theory of elastic deformation $$\sigma \max. = \frac{6}{t_P{}^2} M_1 \qquad (2)$$

Where,

P=applied load
a=rib spacing
A=loaded area
σ=stress

From Eq. 1 and 2, $$\sigma = \frac{.498 P a^2}{t_P{}^2 A} \qquad (3)$$

or, $$a = t_P \sqrt{\frac{\sigma A}{.498 P}} \qquad (4)$$

Now the weight of the bottom plate plus the ribs:

$$W = \left\{ p(wl t_P) + \frac{l}{a}(h t_R w) \right\} \qquad (5)$$

where p=density of material
w=width of bottom plate
l=length of bottom plate

Substituting Eq. 4 into Eq. 5 and dividing by $wlp$:

$$\frac{W}{wlp} = t_P + \frac{l}{t_P} h t_R \sqrt{\frac{.498 P}{\sigma A}} \qquad (6)$$

Differentiating and setting $$\frac{dW}{dt} = 0,$$

$$\frac{1}{wlp}\frac{dW}{dt_P} = 1 - \frac{l}{(t_P{}^*)^2} h t_R \sqrt{\frac{.498 P}{\sigma A}} = 0$$

or $$(t_P{}^*)^2 = h t_R \sqrt{\frac{.498 P}{\sigma A}}$$

$$t_P{}^* = (h t_R)^{1/2} \left( \frac{.498 P}{\sigma A} \right)^{1/4} \qquad (7)$$

and, from (4), $$a^* = t_P{}^* \sqrt{\frac{\sigma_A A}{.498 P}} \qquad (8)$$

where $t_P{}^*$=thickness of bottom plate which yields the minimum weight
$a^*$=rib spacing corresponding to $t^*$
$\sigma_A$=allowable stress for material As a numerical example:
If $t_R = \frac{1}{2}$, $h=1$, $P=20{,}000$, $\sigma = 20{,}000$, and $A=7$, then:

$$(t_P{}^*)^2 = \frac{1}{2}\sqrt{\frac{.5 \times 20{,}000}{20{,}000 \times 7}} \text{ or } .133''$$

$$t_P{}^* = .366''$$

$$a^* = .366 \sqrt{14} = 1.37''$$

Fourth, the rib stress is checked to see that it is less than A.

Fifth, using this thickness $T_P$, and given the maximum desired beam deflection, there is calculated the height of the beam and the thickness of the top plate which will give an optimum beam having its natural axis at the center of the beam.

It will be found from the above stated relations of the variables that in substantially all cases the ratio of the spacings of the ribs to the thickness of the bottom plate is suitably 10 or less.

Having thus described my invention, what I claim as new and desire to secure by Letters Patent of the United States is:

A beam for a cutting press comprising, in combination, a base bracket, a plurality of longitudinal vertical cantilever web members extending with continuous coplanar bottom edges to the tip of the beam from rear portions of said web members rigid with said base bracket for the entire height thereof, a bottom plate rigid with said web members along said coplanar bottom edges of the web members, said bottom plate being reinforced against longitudinal bending only by said web members, and at least several uniformly spaced parallel ribs of uniform height lower than said web members and extending laterally from rigid junctions with said web members and rigid with said plate.

References Cited by the Examiner
UNITED STATES PATENTS

| 2,131,744 | 10/1938 | Maeser | 83—540 |
| 2,181,903 | 12/1939 | Maeser | 83—540 |
| 2,230,288 | 2/1941 | Dinzl | 100—214 |
| 3,030,879 | 4/1962 | Lasko | 100—214 |

WILLIAM W. DYER, Jr., *Primary Examiner.*

L. B. TAYLOR, *Assistant Examiner.*